US007337469B2

(12) United States Patent
Osada et al.

(10) Patent No.: US 7,337,469 B2
(45) Date of Patent: Feb. 26, 2008

(54) METHOD AND SYSTEM FOR UNLOCKING DOORWAY

(75) Inventors: Shunichi Osada, Yokohama (JP); Haruhisa Nakajima, Himeji (JP)

(73) Assignees: Alpha Corporation, Yokohama-shi, Kanagawa (JP); Glory Ltd., Himeji-shi, Hyogo (JP)

(*) Notice: Subject to any disclaimer, the term of this patent is extended or adjusted under 35 U.S.C. 154(b) by 859 days.

(21) Appl. No.: 10/362,163

(22) PCT Filed: Aug. 30, 2001

(86) PCT No.: PCT/JP01/07490

§ 371 (c)(1), (2), (4) Date: May 13, 2003

(87) PCT Pub. No.: WO02/18734

PCT Pub. Date: Mar. 7, 2002

(65) Prior Publication Data

US 2004/0078579 A1 Apr. 22, 2004

(30) Foreign Application Priority Data

Aug. 31, 2000 (JP) ............................ 2000-264283

(51) Int. Cl.
*H04L 9/32* (2006.01)
*G06F 21/06* (2006.01)

(52) U.S. Cl. ....................... 726/19; 340/5.51; 340/5.7; 340/5.81

(58) Field of Classification Search ..................... None
See application file for complete search history.

(56) References Cited

U.S. PATENT DOCUMENTS

| | | | | |
|---|---|---|---|---|
| 4,210,899 A * | 7/1980 | Swonger et al. | ............ | 382/125 |
| 6,100,811 A * | 8/2000 | Hsu et al. | .................. | 340/5.83 |
| 6,877,097 B2 * | 4/2005 | Hamid et al. | ............... | 713/186 |
| 6,898,299 B1 * | 5/2005 | Brooks | ....................... | 382/115 |
| 7,020,308 B1 * | 3/2006 | Shinzaki et al. | ............ | 382/124 |
| 7,102,486 B2 * | 9/2006 | Yamagishi | ................. | 340/5.53 |
| 7,242,276 B2 * | 7/2007 | Usui | ......................... | 340/5.53 |
| 2003/0167396 A1 * | 9/2003 | Usui | .......................... | 713/186 |
| 2004/0021552 A1 * | 2/2004 | Koo | .......................... | 340/5.53 |
| 2006/0139148 A1 * | 6/2006 | Faro et al. | ................. | 340/5.73 |

(Continued)

FOREIGN PATENT DOCUMENTS

DE 198 03 574 A1 8/1999

(Continued)

*Primary Examiner*—Christopher Revak
(74) *Attorney, Agent, or Firm*—The Nath Law Group; Jerald L. Meyer; Stanley N. Protigal

(57) ABSTRACT

An unlock system does not use a key that might be copied so that only a correct person can unlock a door and security is enhanced. Unlock records of door-lock are stored in a limited memory capacity in volume.

Fingerprint data input to a fingerprint input section 21 disposed outside a door 11 provided on a doorway 10 is detected, and the detected fingerprint data is verified against previously registered fingerprint data. If it was confirmed that the detected fingerprint data coincided with the registered fingerprint data, an unlock signal is output to unlock the door-lock, and a setting time or start-using time is stored in a storing section having a clock function.

14 Claims, 4 Drawing Sheets

U.S. PATENT DOCUMENTS

| | | | | |
|---|---|---|---|---|
| 2006/0139149 A1* | 6/2006 | Faro et al. | ................. | 340/5.73 |
| 2007/0188303 A1* | 8/2007 | Faro et al. | ................. | 340/5.73 |

FOREIGN PATENT DOCUMENTS

| | | | | |
|---|---|---|---|---|
| EP | 0 924 655 | A2 | | 6/1999 |
| EP | 0 976 897 | A1 | | 2/2000 |
| GB | 2 345 371 | A | | 7/2000 |
| JP | 60-92573 | | | 5/1985 |
| JP | 63-236879 | | | 10/1988 |
| JP | 03-241182 | | | 10/1991 |
| JP | 05-035952 | | | 2/1993 |
| JP | 07-056960 | | | 3/1995 |
| JP | 07-152938 | | | 6/1995 |
| JP | 10-280754 | | | 10/1998 |
| JP | 11-135155 | | | 5/1999 |
| JP | 2000-020727 | | | 1/2000 |
| JP | 2000-145229 | | | 5/2000 |
| JP | 2000-148166 | | | 5/2000 |
| JP | 2004019140 | A | * | 1/2004 |

* cited by examiner

METHOD AND SYSTEM FOR UNLOCKING DOORWAY

TECHNICAL FIELD

The present invention relates to an unlock method and an unlock system applied to a doorway of a building for example.

BACKGROUND ART

In order to unlock a door-lock of a doorway of a building such as a stand-alone house, an apartment such as a condominium research/development facility and an office building, a normal key, i.e., a latch key or notch key, and a corresponding lock unit are used. A normal key is used also for locking the door of the doorway of each portion in the building.

DISCLOSURE OF INVENTION

However, the normal key which has been conventionally used is easily lost and easily be copied. Therefore, unless a user keep carrying the key any time and anywhere, it is not possible to deny a possibility that the key is copied and illegally used without the user's knowing. That is, there is a problem that even if the door-lock was unlocked using a normal key, it is not clear whether the user himself or herself unlock the lock or a copied key was illegally used.

The present invention provide a lock method and an unlock system of a doorway in which the problem of the conventional unlock system is eliminated, a conventional normal key that might be copied is not used for unlocking a door-lock provided on a doorway, only the user can unlock so that a reliability is enhanced, and unlock record of the door-lock can be saved in high volume.

According to a first technical aspect of the present invention, in a method for unlocking door-lock provided on a doorway, fingerprint data input to a fingerprint input section disposed outside a door is detected, the detected fingerprint data is verified against previously registered fingerprint data, if it was confirmed that the detected fingerprint data coincided with the registered fingerprint data, an unlock signal is output to unlock the door-lock, a start-using data or time is stored.

According to a second technical aspect of the invention, in a method for unlocking door-lock provided on a doorway, fingerprint data input to a fingerprint input section disposed outside a door is detected, the detected fingerprint data is verified against registered fingerprint data previously registered in association with an identification code, if it was confirmed that the detected fingerprint data coincided with the registered fingerprint data, an unlock signal is output to unlock the door-lock, a start-using data or time is stored.

According to a third technical aspect of the invention, in a system for unlocking door-lock provided on a doorway, the system comprises: a fingerprint detector disposed outside a door detecting a fingerprint data to be input to a fingerprint input section; a fingerprint verifying device for verifying fingerprint data detected by the fingerprint detecting means against one or more previously registered fingerprint data; a latch controller for outputting an unlock signal to unlock the door-lock when the fingerprint verifying device confirmed that the detected fingerprint data and the registered fingerprint data coincided with each other; and a storing device having a data function or a clock function, the storing device storing at least an initial setting date or time or a start-using date or time of at least the unlocking system.

BEST MODE FOR CARRYING OUT THE INVENTION

Figures 1A, 1B, 1C:
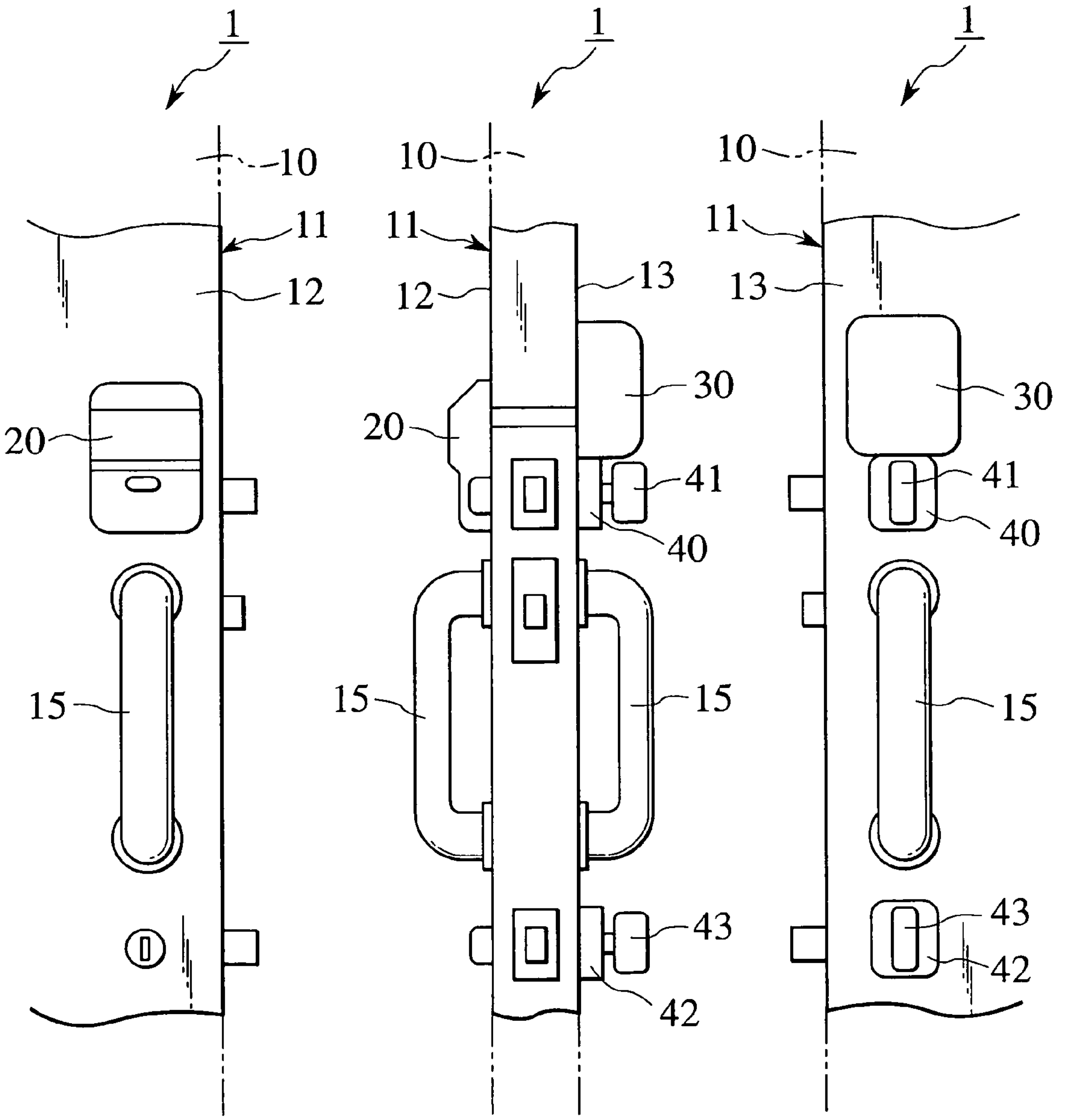
FIG. 1 are views showing structures of an embodiment of an unlock system of a doorway, wherein (a) is a view of the structure as seen from outside of a door, (b) is a view of the structure as seen from an end surface of the door, and (c) is a view of the structure as seen from inside of the door.

Embodiment of the invention will be explained with reference to the drawings. FIG. 1 are views showing structures of an embodiment of an unlock system of a doorway. An unlock system 1 of a doorway comprises an operation unit 20 mounted to an outer side 12 of a door 11, a control unit 30 mounted to an inner side 13 of the door 11, and a lock unit 40 having a knob 41 on the inner side 13 of the door 11. A reference number 15 represents door handles mounted on opposite sides of the door 11. Reference numbers 42 and 43 represent an operation knob and a lock unit corresponding to a normal key.

Figure 2:
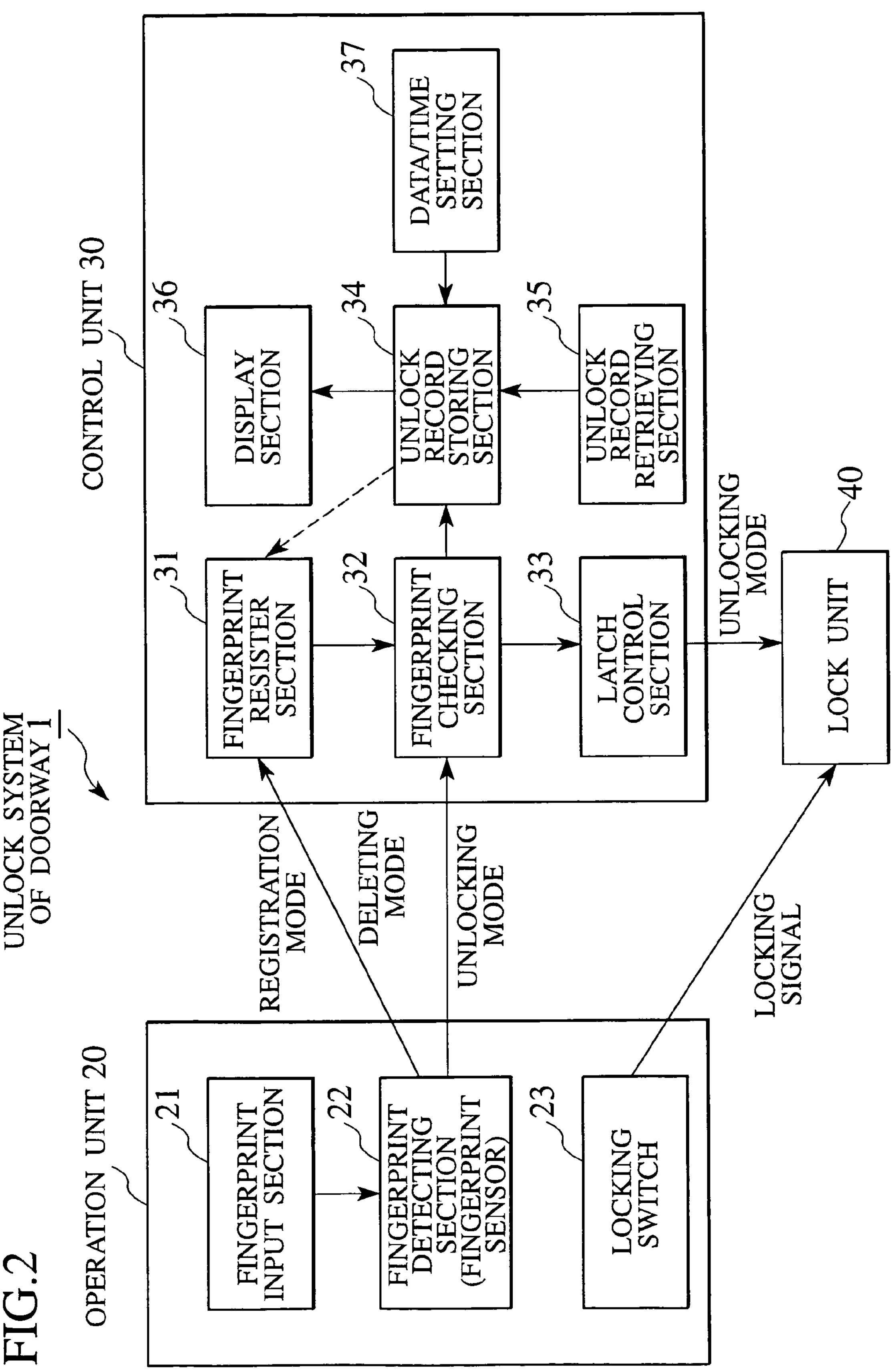
FIG. 2 is a block diagram showing an embodiment of the unlock system of entrance.

FIG. 2 is a block diagram of the unlock system 1 of the doorway. The operation unit 20 comprises a fingerprint input section 21, a fingerprint detecting section (fingerprint sensor) 22 and a locking switch 23. The control unit 30 comprises a fingerprint resister section 31, a fingerprint verifying section 32, a latch control section 33, an unlock record storing section 34, an unlock record retrieving section 35, the data/time setting section 37, and a display section 36. Necessary electric power is supplied from a battery or appropriate DC power supply to each part of the operation unit 20, each part of the control unit 30 and each part of the lock unit 40, and this state is not illustrated in the drawings.

Figure 3:
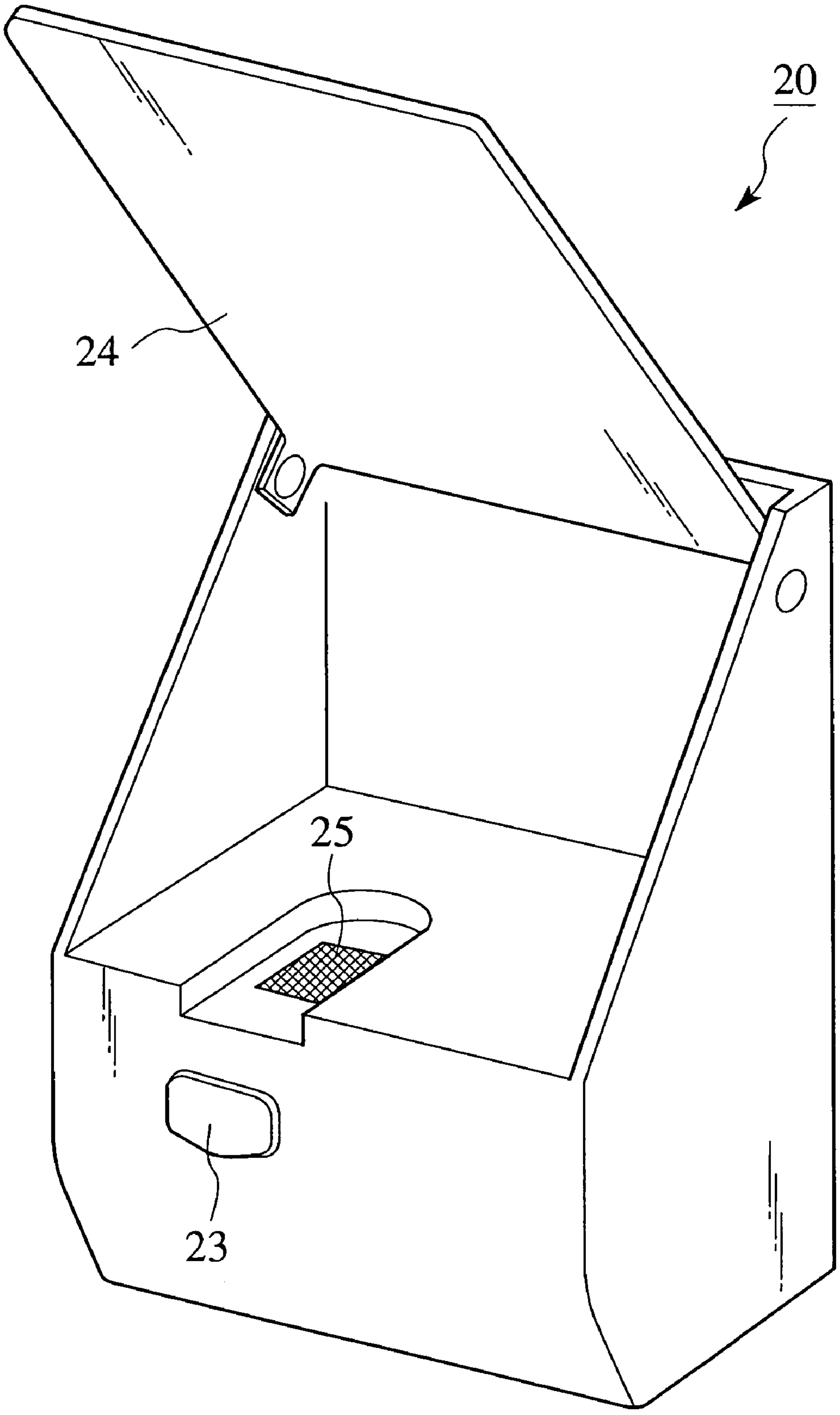
FIG. 3 is a explanatory perspective view of an operation unit.

As shown in FIG. 3, according to the operation unit 20, if a cover 24 is opened, a fingerprint input surface 25 of the fingerprint input section 21 appears. If a user puts his or her finger on the fingerprint input surface 25, the fingerprint input section 21 becomes ON. If an input fingerprint data is detected by the fingerprint detecting section (fingerprint sensor) 22, the detected fingerprint data is transmitted to a fingerprint verifying section 32 of the control unit 30.

If the locking switch 23 is pushed, the operation unit 20 transmits a lock signal to the lock unit 40. With this signal, if the key is unlocked, the lock unit 40 locks electrically.

The control unit 30 is in an unlocking operation mode by fingerprint data input in its normal state, but the control unit 30 is switched to a register/delete operation mode of fingerprint data by an appropriate operation. That is, in the case of the register/delete operation mode of the fingerprint data, if the fingerprint data detected by the operation unit 20 is sent from the fingerprint detecting section (fingerprint sensor) 22 to the fingerprint resister section 31, the fingerprint data is registered together with the identification code in the fingerprint resister section 31. If an arbitrary identification code is designated and deleting operation is carried out, a fingerprint data corresponding to the identification code is deleted together with the identification code.

When the control unit 30 is in the unlocking operation mode by a normal fingerprint data input, if a fingerprint data detected by the operation unit 20 is sent from the fingerprint detecting section (fingerprint sensor) 22 to the fingerprint verifying section 32, the fingerprint data is verified against a fingerprint data that was previously registered in the fingerprint resister section 31. If a plurality of registered fingerprint data exist, the fingerprint data is verified against the registered fingerprint data one by one. If the detected fingerprint data coincides with any one of the registered fingerprint data, the fingerprint verifying section 32 sends a coinciding signal to the latch control section 33, and with this signal, the latch control section 33 sends the unlock signal to the lock unit 40 to lock the key electrically.

The control unit 30 allows the unlock record storing section 34 having a data function or a clock function to store date or time displayed on a display section 36. The unlock record storing section 34 stores at least date or time when the system was installed or system was first used. With this operation, it is possible to find a starting date of service warranty period for a user.

When the detected fingerprint data coincided with any one of registered fingerprint data, the control unit 30 allows the fingerprint verifying section 32 to send any of the identification code of the coincided registered fingerprint data, the detected fingerprint data and the coincided registered fingerprint data to the unlock record storing section 34, and the latter stores the same.

Therefore, the initially set date or time can be stored in the unlock record storing section 34 by operating the date/time setting section 35 to set the date or time. Further, the first-using date or time can be stored in the unlock record storing section 34 utilizing timing for storing one of the identification code, the detected fingerprint data and coincided fingerprint data after installation.

Any of the identification code stored in the unlock record storing section 34, the detected fingerprint data and the coincided registered fingerprint data is displayed on the display section 36 by retrieving by the unlock record retrieving section 35. Therefore, if the data/time setting section 37 is operated to set date or time at the time of setting, it is possible to confirm the start-using date or time and subsequent unlock record retroactively, when an operator of a maker visits for maintenance or replacement of parts or body. Further, the lock unit 40 can lock and unlock the door by turning the operation knob 41 from inside 13 of the door 11.

Figure 4:
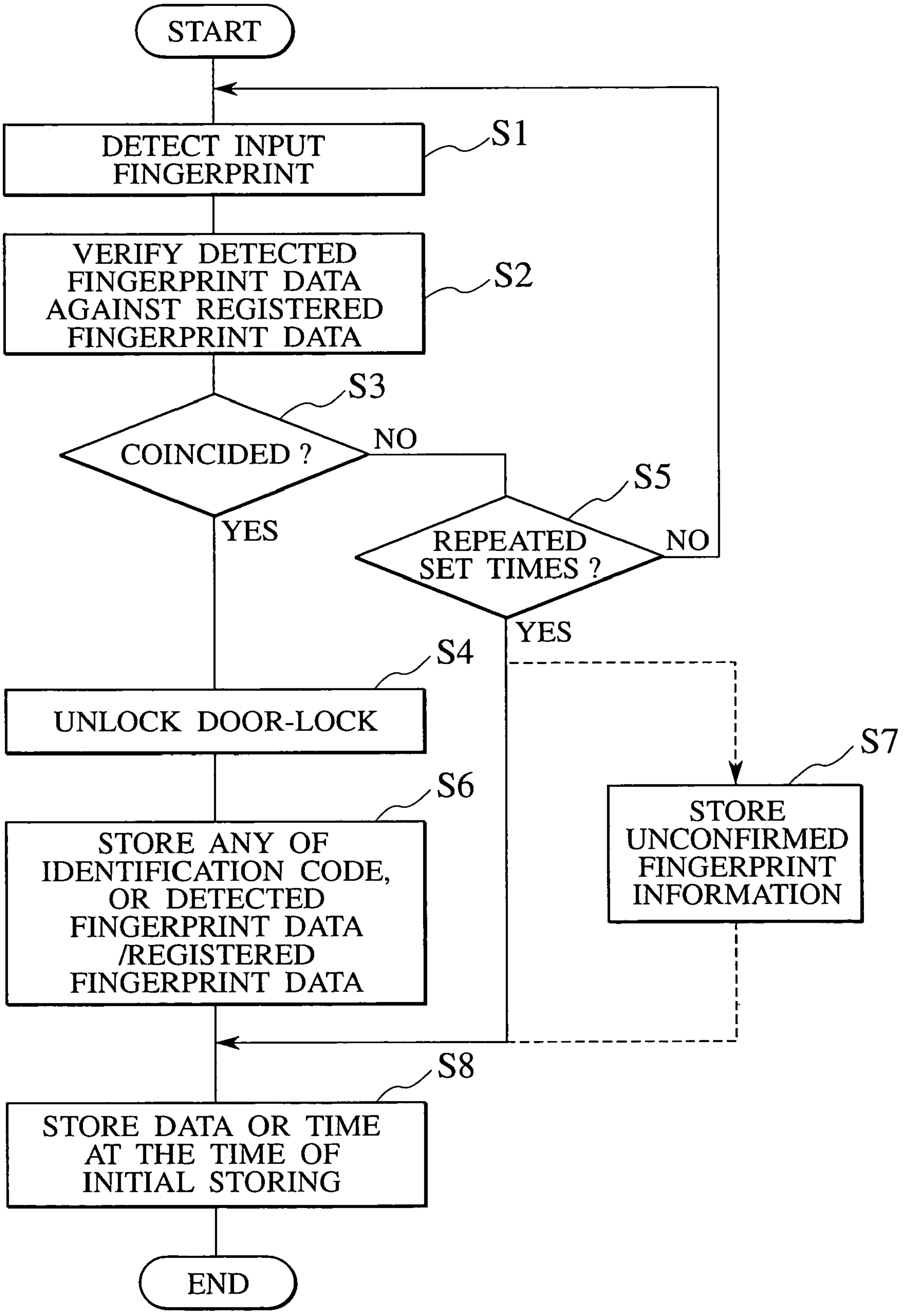
FIG. 4 is a flowchart showing a motion in FIG. 2.

Next, the operation of the above embodiment will be explained using a flowchart shown in FIG. 4. When a door-lock is unlocked from outer side 12 of the door 11, first, the cover 24 of the operation unit 20 is opened, a user puts his or her finger on the fingerprint input surface 25 and inputs the fingerprint data. Then, the fingerprint data input to the fingerprint input section 21 is detected by the fingerprint detecting section (fingerprint sensor) 22 (step S1).

Then, the detected fingerprint data is sent to the fingerprint verifying section 32 of the control unit 30 from the fingerprint detecting section (fingerprint sensor) 22, and the fingerprint verifying section 32 verifies the fingerprint data against fingerprint data which were previously registered in the fingerprint resister section 31 (step S2).

If the detected fingerprint data coincided with any one of the registered fingerprint data (YES in step S3), the lock unit 40 receives the unlock signal from the latch control section 33 to unlock the door-lock electrically (step S4). At that time, it is preferable to inform of the unlock by a buzzer.

On the other hand, if the detected fingerprint data did not coincide with the registered fingerprint data (NO in step S3), input of the fingerprint data is again required up to a preset times (e.g., three times) (step S5). At that time, it is preferable to inform the user to again input the fingerprint data by a warning buzzer. When it was judged that the input was repeated preset times, the unlock operation is completed. A procedure (step S7) to store a fingerprint data detected in this case in the unlock record storing section 34 as an unconfirmed fingerprint data, or to store information that the fingerprint data is unconfirmed in the unlock record storing section 34 or the fingerprint resister section 31 maybe added. With this step, the unconfirmed fingerprint data can be verified when the unlock record is searched in the future.

When the lock unit 40 unlocked the door-lock electrically (step S4), the fingerprint verifying section 32 sends an identification code of the coincided registered fingerprint data to the unlock record storing section 34 and the latter stores the identification code (step S6) at the same time.

The unlock record storing section 34 stores the date or time set at the time of installation together with any of the identification code stored in the unlock record storing section 34, the detected fingerprint data and the coincided registered fingerprint data. Therefore, when the operator of the maker visits for replacing the part or body after installation, it is possible to confirm the data and time of the last maintenance and subsequent unlock record retroactively. Further, it is possible to confirm the unconfirmed fingerprint concerning the unlocking operation registered in step S7 and the date at a later date.

After installation, when the identification code of the coincided registered fingerprint data, the detected fingerprint data and the coincided registered fingerprint data is stored first, its date or time is also stored in the unlock record storing section 34 (step S8). Whenever the record data such as the identification code is stored, its date and time can be stored.

Although the invention is applied to the door 11 provided on the doorway 10 of the building in this embodiment, the invention is not limited to this, and the invention can be applied to a door or similar structure provided on a doorway of each portion in a building.

According to the embodiment, when the door-lock provided on the doorway is unlocked, an identification system using no normal key that might be copied is employed. Therefore, the lock can be unlocked only by a correct person, and high reliability can be secured. Further, it is possible to any time confirm the installation date or time, or start-using date or time. Therefore, it is possible to retroactively confirm the setting date or time or the start-using date or time that is required for executing insurance that the maker assures the quality of product for a constant period. As a result, it is possible to ensure the effectiveness of the quality insurance within the insurance period for all users without distinguishing a user who carried out sending procedure of the warranty and a user who did not, and it is possible to realize insurance effectiveness that is the same as that obtained when recovery factor of the warranty is enhanced to substantially 100%.

The invention claimed is:

1. A method for unlocking door-lock provided on a doorway comprising the steps of:

detecting fingerprint data to be input to a fingerprint input section disposed outside a door;

verifying the detected fingerprint data against one or more previously registered fingerprint data;

outputting an unlock signal to unlock the door-lock when it was confirmed that the detected fingerprint data coincided with the registered fingerprint data;

storing initial data, including at least an initial setting date or time and a start-using date or time in the unlocking method, said initial data providing an indication of a starting date; and providing a display, the display capable of displaying the initial data.

2. A method according to claim 1 wherein in the storing operation, the fingerprint data that unlocked and date information or time information are further stored.

3. A method according to claim 1, further comprising said initial data providing an indication of a starting date for indicating a warranty period of use.

4. A method for unlocking door-lock provided on a doorway comprising the steps of:

detecting fingerprint data to be input to a fingerprint input section disposed outside a door;

verifying the detected fingerprint data against one or more fingerprint data previously registered in association with identification code having much smaller data amount than that of the fingerprint data;

outputting an unlock signal to unlock the door-lock when it is confirmed that the detected fingerprint data coincided with the registered fingerprint data;

storing initial data, including at least an initial setting date or time and a start-using date or time in the unlocking method, said initial data providing an indication of a starting date; and providing a display, the display capable of displaying the initial data.

5. A method according to claim 4 wherein the storing operation further stores identification code of the coincided registered fingerprint data and time information or time information.

6. A method according to claim 4, further comprising said initial data providing an indication of a starting date for indicating a warranty period of use.

7. A system for unlocking door-lock provided on a doorway comprising:

a fingerprint detector disposed outside a door detecting a fingerprint data to be input to a fingerprint input section;

a fingerprint verifying device for verifying fingerprint data detected by the fingerprint detecting means against one or more previously registered fingerprint data;

a latch controller for outputting an unlock signal to unlock the door-lock when the fingerprint verifying device confirmed that the detected fingerprint data and the registered fingerprint data coincided with each other;

a storing device having a data function or a clock function, the storing device storing initial data, including at least an initial setting date or time or a start-using date or time of at least the unlocking system, said initial data providing an indication of a starting date; and a display capable of displaying the initial data.

8. A system according to claim 7 wherein the storing device further stores the coincided detected fingerprint data or registered fingerprint data.

9. A system according to claim 7 wherein:

the fingerprint data is mounted outside the door, and the fingerprint verifying device, the latch controller and the storing device are mounted inside the door.

10. A system according to claim 7, wherein said initial data provides an indication of a starting date for indicating a warranty period of use.

11. A system for unlocking door-lock provided on a doorway comprising:

a fingerprint detector disposed outside a door detecting a fingerprint data to be input to a fingerprint input section;

a fingerprint verifying device for verifying fingerprint data detected by the fingerprint detecting means against one or more fingerprint data previously registered in association with identification code;

a latch controller for outputting an unlock signal to unlock the door-lock when the fingerprint verifying device confirmed that the detected fingerprint data and the registered fingerprint data coincided with each other;

a storing device having a data function or a clock function, the storing device storing initial data, including installation date or time or start-using date or time of at least the unlocking system, said initial data providing an indication of a starting date; and a display capable of displaying the initial data.

12. A system according to claim 11 wherein the storing device further stores an identification code of the coincided one register data.

13. A system according to claim 11 wherein:

the fingerprint data is mounted outside the door, and the fingerprint verifying device, the latch controller and the storing device are mounted inside the door.

14. A system according to claim 11, wherein said initial data provides an indication of a starting date for indicating a warranty period of use.

* * * * *